(12) United States Patent
Ganguli et al.

(10) Patent No.: US 10,721,137 B2
(45) Date of Patent: Jul. 21, 2020

(54) PERFORMANCE ASSURANCE USING WORKLOAD PHASE DETECTION

(71) Applicant: Intel Corporation, Santa Clara, CA (US)

(72) Inventors: Mrittika Ganguli, Bangalore (IN); Rahul Khanna, Portland, OR (US); Ananth S. Narayan, Bangalore (IN); Piyush Gupta, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 884 days.

(21) Appl. No.: 15/198,300

(22) Filed: Jun. 30, 2016

(65) Prior Publication Data
US 2018/0006903 A1    Jan. 4, 2018

(51) Int. Cl.
*H04L 12/24* (2006.01)
*H04L 29/08* (2006.01)

(52) U.S. Cl.
CPC ...... *H04L 41/5009* (2013.01); *H04L 41/5019* (2013.01); *H04L 41/5035* (2013.01); *H04L 67/1008* (2013.01); *H04L 67/1012* (2013.01)

(58) Field of Classification Search
CPC ............. H04L 41/5009; H04L 41/5019; H04L 41/5035; H04L 67/1008; H04L 67/1012
See application file for complete search history.

(56) References Cited

U.S. PATENT DOCUMENTS

| | | | | |
|---|---|---|---|---|
| 8,352,956 B1* | 1/2013 | Kishore | ................. | G06F 9/485 718/101 |
| 8,799,916 B2* | 8/2014 | Cherkasova | .......... | G06F 9/5066 718/100 |
| 9,514,022 B1* | 12/2016 | Basak | ................. | G06F 11/3447 |
| 2013/0185729 A1* | 7/2013 | Vasic | .................... | G06F 9/5072 718/104 |

(Continued)

OTHER PUBLICATIONS

Antonescu, Alexandru-Florian, et al., "Improving Management of Distributed Services U sing Correlations and Predictions in SLA-Driven Cloud Computing Systems", IEEE 978-1-4799-0913-1/14, (2014), 8 pgs.

(Continued)

*Primary Examiner* — Gil H. Lee
(74) *Attorney, Agent, or Firm* — Schwegman Lundberg & Woessner, P.A.

(57) ABSTRACT

Systems described herein operate to improve network performance in a multi-tenant cloud computing environment. Systems can include communication circuitry and processing circuitry to generate a phase sequence matrix that indicates the identity and number of phases of a workload by measuring resources of the compute node during execution of the workload throughout a lifetime of the workload. The processing circuitry can generate a workload fingerprint that includes the phase sequence matrix and a phrase residency matrix. The phase residency matrix can indicate the fraction of execution time of the workload spent in each phase identified in the phase sequence matrix. A cloud controller (Continued)

can access the workload fingerprint for multiple workloads operating on multiple compute nodes in the cloud cluster to adjust workload allocations based at least on these workload fingerprints and on whether service level objectives (SLOs) are being met.

17 Claims, 7 Drawing Sheets

(56) References Cited

U.S. PATENT DOCUMENTS

| | | | | |
|---|---|---|---|---|
| 2014/0244643 | A1* | 8/2014 | Basak | G06F 11/3414 707/737 |
| 2015/0006716 | A1* | 1/2015 | Suchter | G06F 9/5038 709/224 |
| 2015/0199208 | A1* | 7/2015 | Huang | G06F 9/45533 718/1 |
| 2016/0150003 | A1* | 5/2016 | Magdon-Ismail | G06F 12/00 709/223 |
| 2017/0109199 | A1* | 4/2017 | Chen | G06F 9/4881 |

OTHER PUBLICATIONS

Caron, Eddy, et al., "Forecasting for Cloud computing on-demand resources based on pattern matching", Hal archives-ouvertes.fr, (Oct. 19, 2011), 24 pgs.

Gabbay, Gabbay, et al., "The Effect of Instruction Fetch Bandwidth on Value Prediction", Department of Electrical Engineering, 10 pgs.

Lau, Jeremy, et al., "Transition Phase Classification and Prediction", In the 11th International Symposium on High Performance Computer Architecture, (Feb. 2005), 12 pgs.

Saripalli, Prasad, et al., "Load Prediction and Hot Spot Detection Models for Autonomic Cloud Computing", 2011 Fourth IEEE International Conference on Utility and Cloud Computing, (2011), 6 pgs.

Sembrant, Andreas, et al., "Efficient Software-based Online Phase Classification", IEEE 978-1-4577-2064-2/11, (2011), 104-115.

Sherwood, Timothy, et al., "Phase Tracking and Prediction", In Proceedings of the 30th International Symposium on Computer Architecture (ISCA), (Jun. 2003), 12 pgs.

Smith, Warren, et al., "Predicting Application Run Times Using Historical Information", (1998), 14 pgs.

* cited by examiner

PERFORMANCE ASSURANCE USING WORKLOAD PHASE DETECTION

TECHNICAL FIELD

Embodiments described herein generally relate to computer systems. More particularly, embodiments relate to cloud computing.

BACKGROUND

Cloud computing refers to highly scalable networked computing systems capable of delivering elastic computing performance to numerous users. Cloud computing typically involves clusters of densely packed computing servers, called compute nodes, with each compute node potentially executing dozens of virtual machines. Typically, each node includes a hypervisor or other virtualization framework, and the entire cloud computing cluster includes one or more cloud controllers that manage instantiation of virtual machines on the particular compute nodes.

In a multi-tenant cloud computing environment, different customers may control the virtual machines on a particular compute node. Thus, the resources of the compute node, such as processor, network, and storage resources, must be shared among the virtual machines, and thus, among different customers. In some multi-tenant environments, resource allocation is based on central processing unit (CPU) speed rather than workload performance, resulting in performance loss and under-utilization of resources.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
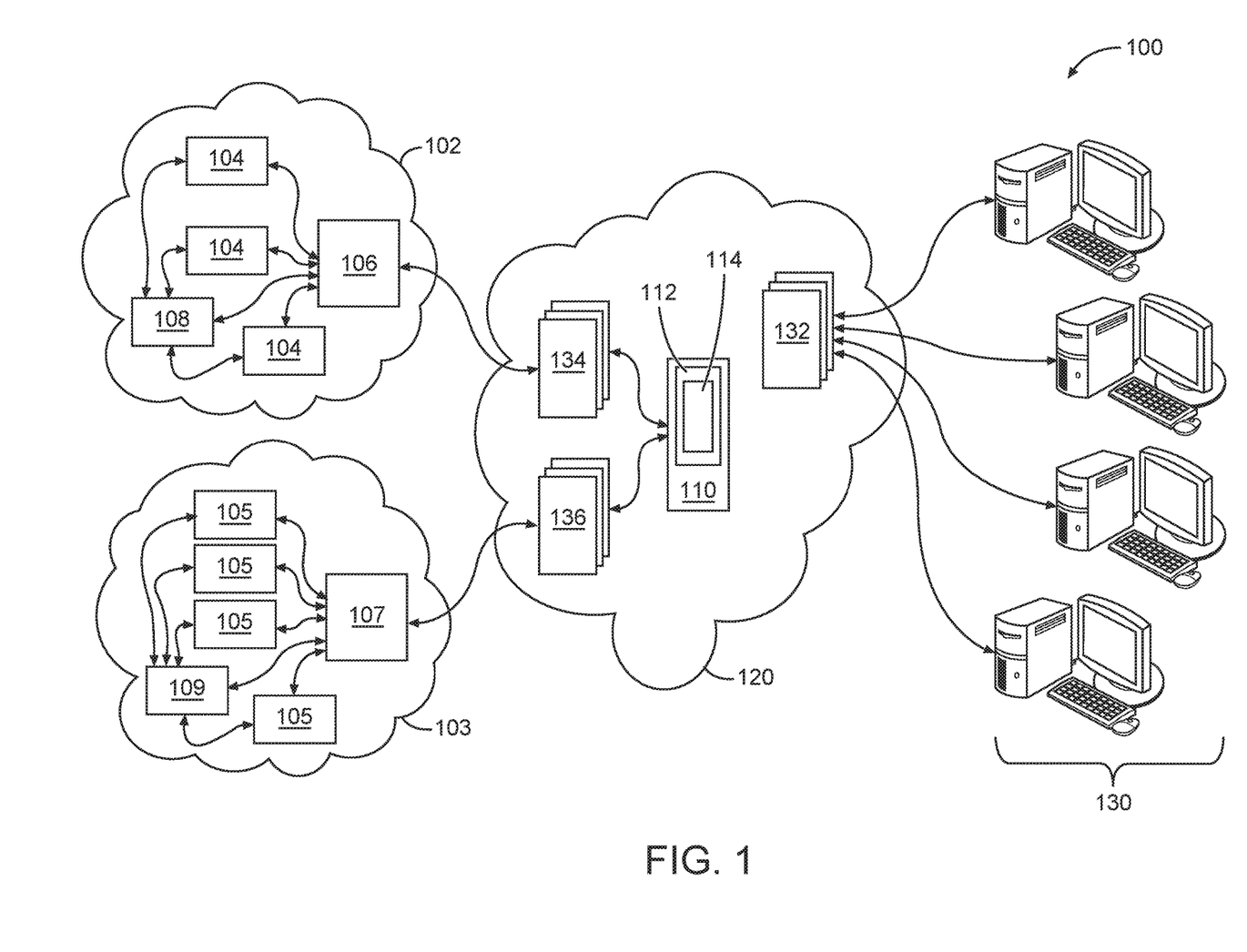
FIG. 1 illustrates a cloud computing environment in which some example embodiments can operate.

FIG. 1 illustrates a cloud computing environment 100 in which some example embodiments can operate. The cloud computing environment 100 can include a number of clouds 102, 103, each of which may comprise a network-based, distributed data processing system to provide one or more cloud computing services, such as "software as a service" (SaaS), "platform as a service" (PaaS), or "infrastructure as a service" (IaaS). The cloud computing environment 100 can also provide utility computing, managed services, web services, and other services. Each cloud 102, 103 may communicate with a server 110 via a network 120, which may also be in communication with one or more clients 130 via network 120. A client 130 may submit a request 132, such as a data processing request, to server 110, which may assign request 132 among clouds 102, 103 as one or more jobs 134, 136 using a manager 112 running on server 110.

Each cloud 102, 103 can include, for example, compute nodes 104, 105, with each compute node 104, 105 executing virtual machines (VMs). In some embodiments, each compute node 104, 105 includes a hypervisor or other virtualization framework, and each cloud 102, 103 includes one or more cloud controllers 106, 107 that manage instantiation of VMs on the particular compute nodes 104, 105. The cloud controllers 106, 107, or the compute nodes 104, 105 can allocate resources to workloads as will be described below in order to achieve selected service level objectives (SLOs).

Workloads, in the context of the cloud computing environment 100 and in the context of embodiments described herein, are applications that execute as a series of phases while operating under multiple constraints. Phases in the context of various embodiments can include, for example, a first phase in which memory resources are used extensively, but other resources (e.g., network resources and processing resources) are used very little. A second phase, on the other hand, may comprise significant networking activity but little to no memory access activity. In other words, a phase can be characterized by the type and amount of resources being used by the workload during its execution. A workload can have vastly different resource requirements in each phase. Each phase can be very different from the others, while still having a fairly homogeneous behavior within a phase, such that a phase can be defined as an interval of execution of the workload during which a selected metric is relatively stable.

Workload constraints can be imposed by shared resource consumption, thermal re-balancing, and quality of service (QoS) objectives, for example. Workload job schedulers in some cloud computing environments 100 can allocate virtual CPU (vCPU), memory, and storage resources according to a defined policy or a pre-configured class of service (e.g., according to a service level agreement (SLA) agreed to by a customer).

Traditional ways of allocating resources focus on resource utilization and not on assessing the workload and adapting and optimizing the allocation of the workload based on the characteristics of both the workload and the compute resources that the workload will utilize during execution. This may be at least partly because most cloud operators do not have knowledge of workload behavioral patterns. For example, cloud operators may not understand or analyze how workload resource requirements vary during each phase of execution of a particular workload. This can result in over-provisioning of infrastructure (such as memory, processors, etc.), and in a failure to dynamically adapt by scaling up or scaling down based on workload resource requirements. As a result, heterogeneous workload patterns may result in sub-optimal job allocation leading to performance loss or under-utilization of compute resources.

Some embodiments address these and other concerns by profiling workloads to reveal time-varying behavior that repeats in some defined patterns over a workload lifetime. Data mining techniques when employed by the compute nodes 104, 105 or other device during workload runtime can discover the existence of workload phases and their corresponding properties. The workload characteristics integrated through the sequence of phases can be combined and represented by a workload fingerprint. Workload fingerprints can predict future behavior and can be used by the cloud controllers 106, 107 and by the individual compute nodes 104, 105 for resource allocation as described later herein.

Once phases of a workload are identified, systems and methods in accordance with some embodiments can identify the resource requirements for each phase and operate to modify the resource allocations to provide the correct resource, and the correct amount of resources, for the workload. In some embodiments, phase information can be used to schedule at least some workloads to increase resource usage while still maintaining desired performance levels in the multi-tenant cloud computing network. In some embodiments, dynamic adjustment is provided as workloads enter and leave each phase, based on predictions regarding the sequence of phases executed by the various workloads.

The compute nodes 104, 105 can capture individual performance characteristics of workloads initially, and at given periodic intervals or on an ad hoc basis, to create workload fingerprints. In addition, dynamic phases of individual workloads can be identified. Use of the dynamic phases can also be used to capture complex interactions between various workloads. The cloud controllers 106, 107 can set performance metrics, such as service level objectives (SLO) metrics, and then the cloud controllers 106, 107 or the compute nodes 104, 105 can perform dynamic allocation or re-allocation when thresholds for those metrics are not met.

Figure 2:
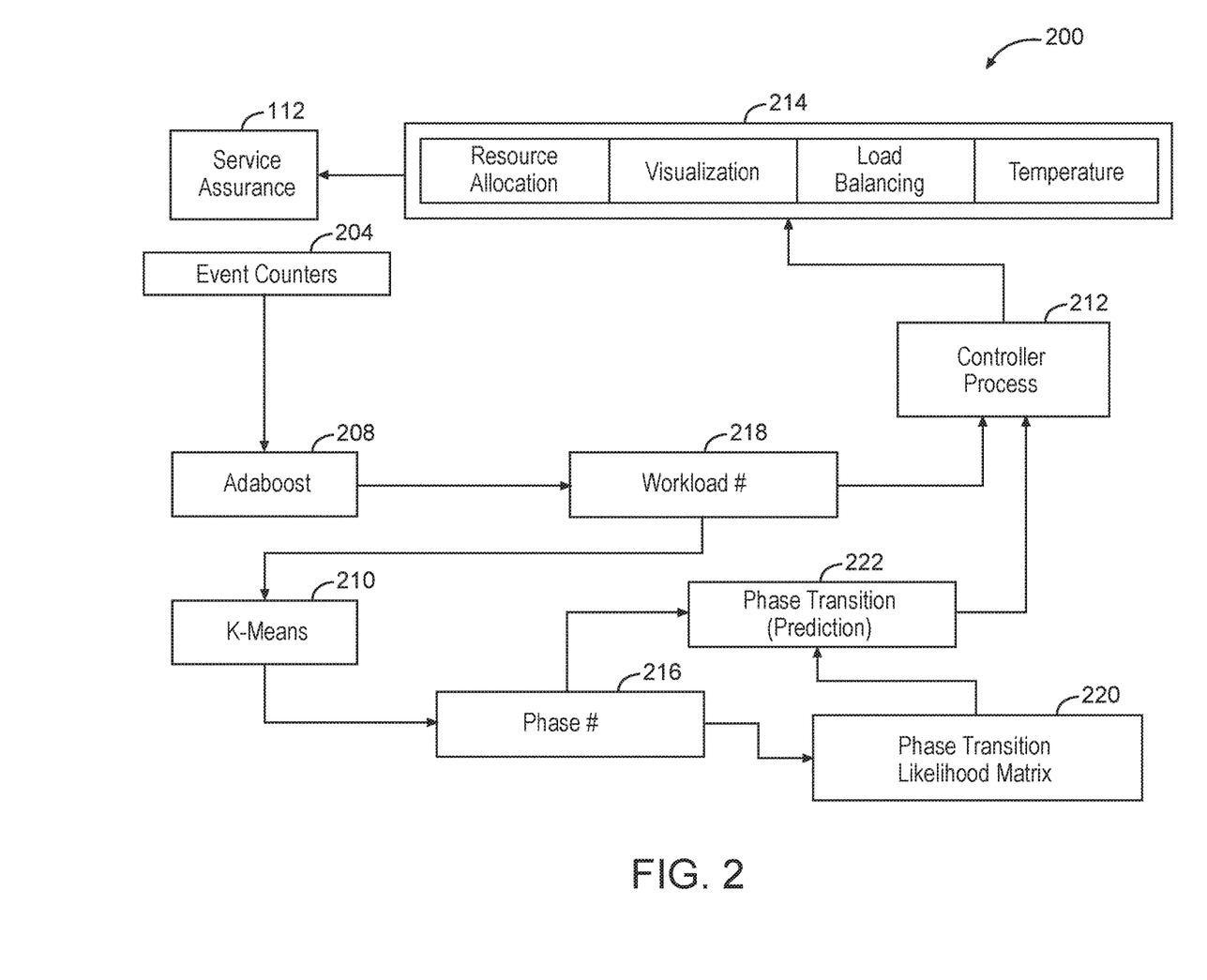
FIG. 2 illustrates a framework for workload phase detection and resource allocation in accordance with some embodiments.

FIG. 2 illustrates a framework 200 for workload phase detection and resource allocation in accordance with some embodiments. Some functions shown in the framework 200 can be performed on the compute nodes 104, 105 of the cloud computing environment 100, or in the cloud controllers 106, 107.

As shown in FIG. 2, the compute nodes 104, 105 gather data to provide to event counters 204. The event counters 204 can collect event counts for each software thread of interest running on respective compute nodes 104, 105 and for each hardware thread when multiple software threads are simultaneously executing on the compute node 104, 105. In embodiments, the events and metrics can include, but are not limited to, interprocess communication events or metrics, cache misses (e.g., data cache misses and instruction cache misses), the number of branch mispredictions, cache occupancy, memory bandwidth, energy consumed by the execution of instructions, stall cycle metrics, instructions per cycle (IPC), etc. Each compute node 104, 105 in the cloud computing environment 100 can provide event counts. The various hardware event data for all, or a portion of, the workloads can be used as a training set for phase detection model generation, wherein a phase detection model defines which phase a workload is in (e.g., initialization, I/O, etc.) based on values for various parameters or aggregations of parameters as described later herein. In addition, phase detection models can be generated individually for each compute node 104, 105 or for a cloud 102, 103. The phase detection models can be stored in the cloud database 108, 109. In embodiments, monitoring agents can access the phase detection model within the cloud controller/s 106, 107 for run-time phase detection.

The event counters 204 can provide counts to various other functions, methods, algorithms, or software packages. For example, the counts can be provided to an Adaboost function 208 or similar function that identifies the workload and provides a workload number 218 as an output. The counts can also be provided to a K-means algorithm 210, which determines the phases and provides a phase number 216 as an output. Adaboost (short for "Adaptive Boosting") and K-means are algorithms well-known to those of ordinary skill in the art.

The workload phase for each workload running on a compute node 104, 105 can be determined based on CPU performance counters and metrics that influence service compute unit (SCU) scores. SCU defines a SLO in terms of a compute consumption metric. The compute consumption metric is based on processor performance characteristics (e.g., the ability to execute instructions). In one embodiment, the compute consumption metric is measured as giga-instructions per second (GIPS) rating. A processor achieves a peak GIPS rating when executing a program that only has instructions of a type having a lowest cycles per instruction (CPI) or highest IPC. The IPC metric value can be influenced by various events or metrics. For example, it is understood that the IPC metric is influenced by cache misses. Execution of phase of a workload can have varying effects on SCU scores, and therefore phases of a workload can be detected by observing the effect of execution of the workload on SCU scores. Additionally, a workload SCU will typically be dependent on the frequency (P-state) of the core the workload is running on. For example, a workload running on a high-frequency core will have a relatively higher SCU, and a workload running on a low-frequency core will have a lower SCU. SCU is defined in further detail below.

The phase number 216 can be used in combination with other previously or subsequently generated phase numbers to generate a phase transition matrix 222 and a phase transition likelihood matrix 220. The phase transition matrix 222 includes predictions for the next phase that a workload will enter, based on inputs of the phase number 216 and the phase transition likelihood matrix 220. The phase transition matrix 222 and phase transition likelihood matrix 220 can be generated as part of an initial machine learning phase of the framework 200. For example, once a sequence of phases is identified, it can be used to predict future phase and the duration of current phases. A discrete time Markov chain, as known to those of ordinary skill in the art, for example, can be used to identify underlying patterns in a time series sequence of changing phases. Real-time data can be monitored by the compute nodes 104, 105 to produce a model of recently observed data, which is then matched to the state of the Markov model. By tracing the time series progression from one phase to another, the compute node 104, 105 can build a phase transition function of the Markov model. Updates to the phase transition likelihood matrix 220 or the phase transition matrix 222 can be performed periodically or upon user request or upon request by the cloud controllers 106, 107 or other element in the cloud computing environment 100.

The workload number 218 and phase transition matrix 222 are provided to a controller process 212, which then takes actions 214 relative to resource allocation, load balancing thermal re-balancing, and any other action that could potentially be taken in order to manage the performance of the workload, according to methods described later herein (with respect to, e.g., FIG. 3).

Any functions of the service management framework 200 can be implemented in the form of agents that can be integrated as plug-ins or peers of the service management framework 200. During operation, agents can calculate various scores to be used in optimizing resources. For instance, CPU utilization scores can be computed at the granularity of each CPU core of each socket, a CPU cache contention score can be determined for each VM of each socket, and a CPU over-utilization score (COUS) can be utilized if a candidate workload is being considered for addition to a compute node 104, 105. Embodiments described below can use the various scores, phase information, and workload information to optimize resources. Systems, methods and apparatuses of various embodiments can anticipate and plan for changes in resource demands based on the phases of workloads executing on the compute nodes 104, 105.

Figure 3:
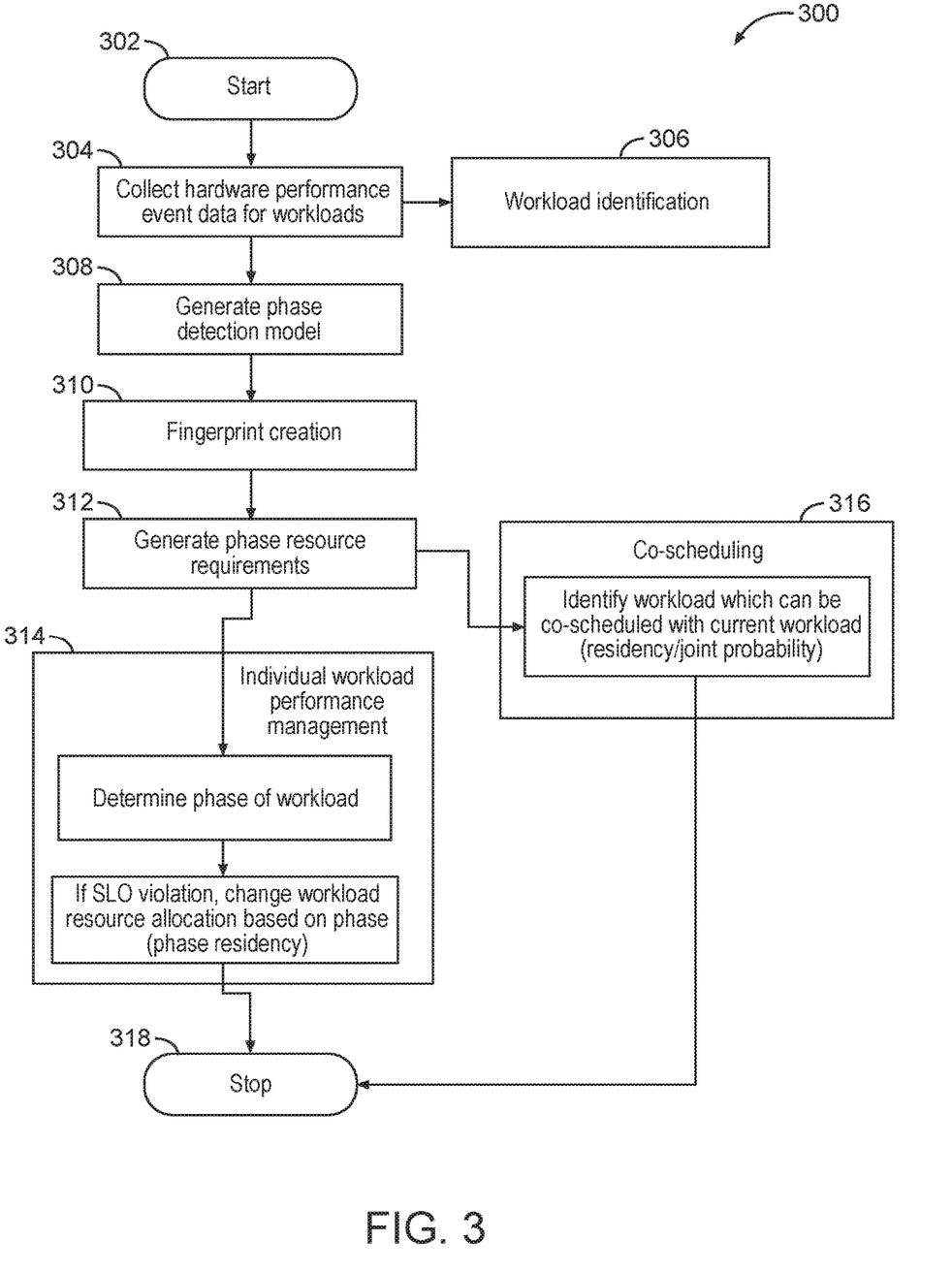
FIG. 3 illustrates an example method for workload fingerprint creation and usage in accordance with some embodiments.

FIG. 3 illustrates an example method 300 for workload fingerprint creation and usage in accordance with some embodiments. Operations of example method 300 can be performed by each of the compute nodes 104, 105 or by cloud controllers 106, 107 (FIG. 1).

The method 300 can begin with operation 302 and proceeds to operation 304 in which the compute nodes 104, 105 collect event data and metrics as described earlier herein. Compute nodes 104, 105 can identify workloads in operation 306 using various metrics and identification or feature information. As described earlier herein, Adaboost is one algorithm that can identify workloads or workload types.

The example method 300 can continue with operation 308, with the compute node 104, 105 generating a phase detection model based on the information collected in operation 304 and based on the workload identification performed in operation 306. The phase detection model relates metrics and event data received in operation 304 to the phases of a workload, such that by subsequently detecting conditions in line with those metrics and event data, the compute node 104, 105 or the cloud controller 106, 107 can determine what phase the corresponding workload is currently under execution. In embodiments, the compute node 104, 105 can provide the phase detection model to the cloud database 108, 109 for later use or for sharing with the cloud controller 106, 107. The compute node 104, 105 can update the phase detection model and the workload fingerprint (described later herein) based on subsequent measurements made during operation in the network (e.g., in the cloud 102, 103).

The example method 300 can continue with operation 310 with the compute node 104, 105 creating workload fingerprints. Creating the workload fingerprints can include generating phase sequence matrices and residency matrices. For example, creating workload fingerprints can include generating a phase sequence matrix that indicates the identity and number of phases of a workload by measuring resource usage in the compute node 104, 105 during execution of the workload, in some embodiments throughout a lifetime of the workload although embodiments are not limited thereto. The compute node 104, 105 can then generate the workload fingerprint that includes this phase sequence matrix and a phase residency matrix. The phase residency matrix indicates the fraction (either relative or absolute) of execution time that the workload spends in each phase identified in the phase sequence matrix.

The compute nodes 104, 105 can continuously or periodically generate any or all of the above matrices throughout operation in the cloud computing environment 100, and the compute nodes 104, 105 can perform learning operations on at least some of the matrices. For example, the compute nodes 104, 105 can update probabilities within the phase transition likelihood matrix 220 as new data is observed or captured concerning phase transitions. In some embodiments, the phase transition likelihood matrix 220 or other matrix can store a joint probability that reflects the probability of two workloads entering the same phase. If two workloads enter the same phase, the two workloads can then contend for the same resources or not. Accordingly, a compute node 104, 105 can allocate additional amounts of a resource according to the calculated or predicted probability that two or more workloads will use the resource.

Figure 4:
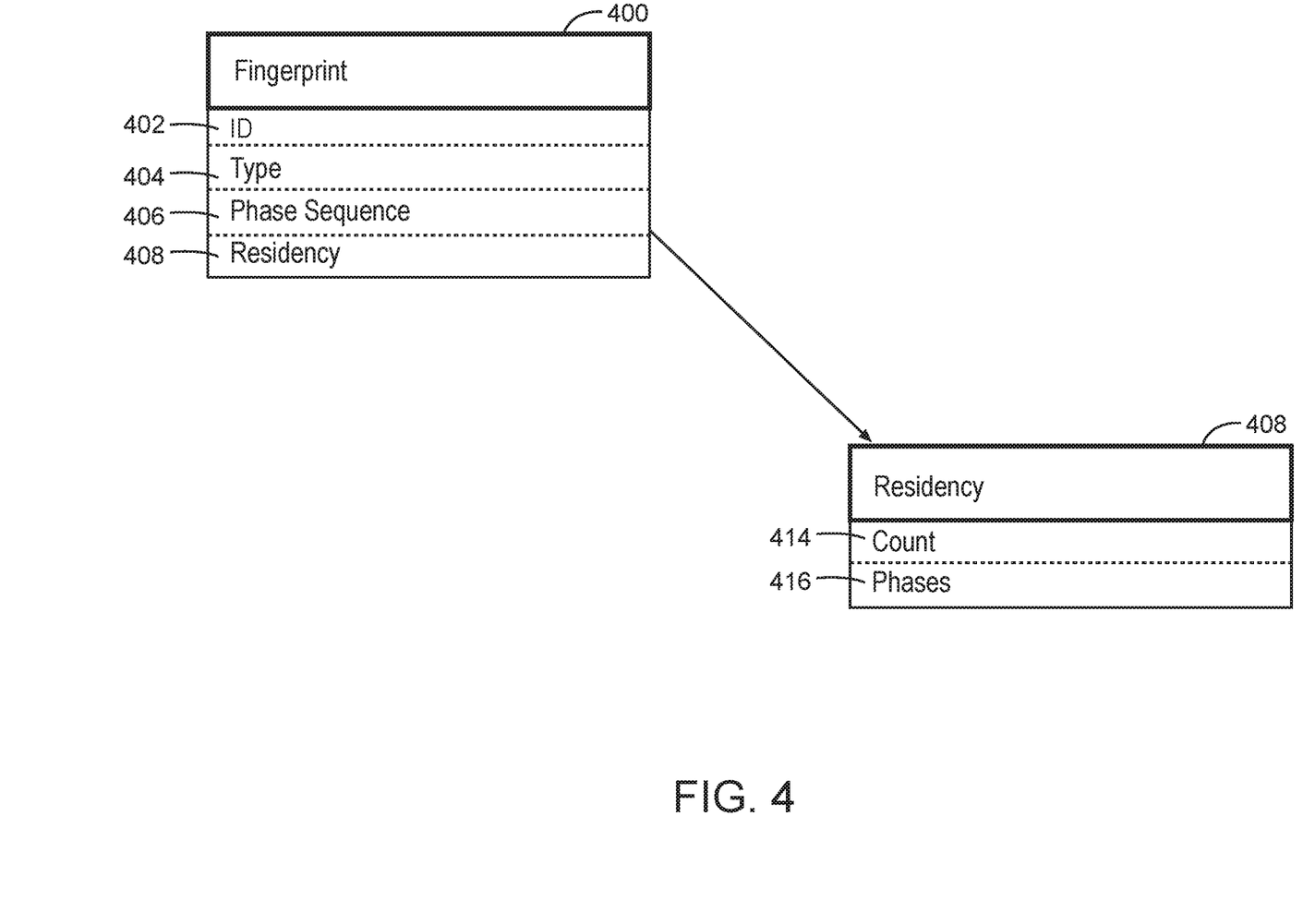
FIG. 4 illustrates an example of a workload fingerprint in accordance with some embodiments.

FIG. 4 illustrates an example of a fingerprint 400 in accordance with some embodiments. As shown in FIG. 4, the fingerprint 400 can include an identifier 402, a workload type 404, a phase sequence 406, and a phase residency matrix 408. The identifier 402 can be used to identify the fingerprint 400 for retrieval from or saving in storage. The phase sequence 406 can include a series of phase numbers that the workload will go through during operation. For example, if two phases are present for a workload, and the workload alternates between these phases, the phase sequence 406 can include the series "12121212" (or a representation or characterization thereof, for example, as a text string) indicating that the workload alternates between phase 1 and phase 2.

The phase residency matrix 408 can include a count 414 to reflect the total execution time that the workload spends in each of phases 416. Phase residency data can additionally be used by the compute node 104, 105 or cloud controller 106, 107 to gauge what sorts of resource allocations, re-allocations, or system adaptations are feasible. For example, if a phase has a phase residency predicted to be quite short, then some adaptations such as voltage scaling, frequency scaling, or load balancing might not be feasible because they will not have an effect on the performance of the compute node 104, 105 before the workload changes from that phase. These and other adaptations can have sizable performance and energy overheads to overcome and therefore the compute node 104, 105 or the cloud controller 106, 107 may apply them only when a trend or condition is likely to last long enough to overcome any transition costs.

Returning to FIG. 3, once the workload fingerprints are created, the method 300 can proceed to operation 312 where the compute node 104, 105 can determine phase resource requirements. For example, a first phase can include reading in data from a database, in which case an amount of memory resources may be needed. A second phase can include a data processing activity, where additional CPU resources may be needed. It should be noted that the various possible phases of a workload are not limited to the phases given here.

The method 300 can proceed to operation 314 where workload performance can be managed. Workload performance management can include the compute node 104, 105 determining a current phase of workload. For example, during operation 314, the compute node 104, 105 can determine whether a workload is in a data reading phase, a data processing phase, or a data writing phase, etc.

Also, during the workload management, phase residency can be used to determine if workload resource allocation should be changed. In embodiments, the compute node 104, 105 can receive values for desired or minimum SLOs via communication circuitry 706 (FIG. 7) from the cloud controller 106, 107. If there is an SLO violation (e.g., if a minimum or desired SLO is not being met), the resources allocated to a phase can be changed. Accordingly, the compute node 104, 105 can allocate a resource of the compute node 104, 105 based on the workload fingerprint and based on comparisons between the value corresponding to the SLO parameter and measurements made during operation of the compute node 104, 105 in a network (e.g., the cloud 102, 103 or the cloud computing environment 100).

Note that the method 300 can also proceed to operation 316 in parallel with operation 314. At operation 316, a compute node 104, 105 or other device (e.g., a cloud controller 106, 107 or manager 112) can conduct co-scheduling of multiple workloads in a same timeslot. The co-scheduling of events can be based on workload fingerprints for the respective workload. For example, once a phase of a first workload is determined, the compute node 104, 105 can use residency information or joint probability information to determine what other workloads can be executed at the same time. The compute node 104, 105 or cloud controller 106, 107 can perform these and other operations regarding workloads, phases, and workload fingerprints because the compute node 104, 105 had previously provided this and other information for storage in the cloud database 108, 109. Additionally, the cloud controller 106, 207 can access the cloud database 108, 109 and perform operations on the compute node 104, 105 using data stored in the cloud database 108, 109.

The following is an example pseudocode for implementing workload performance management in shared tenant environment, such as the environment 100 (FIG. 1). One aspect of the pseudocode is to maximize performance of workloads indicated by an SLO metric, such as SCU.

TABLE 1

Pseudocode for workload performance management in a shared tenant environment

1. For each Node $h_i$, in C,
   a. For each workload $w_i$ belonging to W, on node h
      i. If SLO($w_i$) < min(SLO($w_i$)) OR SLO($w_i$) > max(SLO($w_i$))
         1. resource = IdentifyResourceToManage(w, SLO($w_i$), events($w_i$), P($w_i$))
         2. If (SLO) < min(SLO($w_i$)) :
allocateaction <– allocate(resource)
         3. Else allocateaction <– throttle(resource)
      ii. For $w_j$ in W
         1. If P($w_i$) == P($w_j$)
           a. Core = getCurrentCore($w_j$)
           b. moveaction = move($w_i$, Core)
         2. Else
           a. Core = getCurrentCore($w_j$)
           b. moveaction = move($w_i$, !Core)
      iii. action = (allocateaction, moveaction)
   b. If shared tenant node
      i. If SLO($w_j$) >= min(SLO($w_j$)) AND SLO($w_j$) <= max(SLO($w_j$))
         1. If Impact($w_i$, resource) == 0
           a. Execute(action); continue;
      ii. Else,
         1. If Resources($w_i$) + Resources($w_j$) < Resources(i)
           a. moveaction<–move($w_i$, newCore)
         2. else
           a. newNode = searchForNode( )
           b. if newNode == NULL
              i. newNode = composeNode(P($w_i$).residency))
           c. moveaction<–move($w_i$, newNode)
   c. Else execute(action)

In Table 1, Cloud C=(h1, h2 . . . ), where $h_1$ represents a compute node (e.g., compute node 104) belonging to a cloud cluster. W is a set of workloads running on a compute node. P($w_i$) is phase information for workload $w_i$, including phase transition matrix, phase residency, and joint probability matrix. Events(w) is a current set of performance events for workload w. Cores are a set of cores in a compute node 104, 105.

As will be appreciated upon examination of Table 1, for each compute node 104, 105 in a cloud 102, 103, a cloud controller 106, 107 (or the compute node 104, 105) will determine, for each workload, whether an SLO requirement is being met. For example, the cloud controller 106, 107 will determine whether a value for an SLO parameter is above or below a threshold. If the SLO requirement is not being met, the cloud controller 106, 107 will determine which resource needs to be controlled. The cloud controller 106, 107 can allocate additional resources or throttle resources depending on whether the SLO parameter is above or below a threshold. Then, for each workload operating on the compute node 104, 105, the cloud controller 106, 107 or compute node 104, 105 can determine whether to move that workload to a different core of the compute node 104, 105. Further, the cloud controller 106, 107 can create new compute nodes for additional resources.

As disclosed herein, workload fingerprint based remedial action can be used for performance management. An example includes creating a map of a phase number to the resource requirements after analysis of phase-resource requirements and phase-SLO behavior. For instance, for four classes of resource usage (e.g., Least, Low, Medium, High), the following example map could be created and stored as a map data structure:

TABLE 2

Map of phase number to resource type and resource usage level.

| Phase Number | Resource A | Resource B |
| --- | --- | --- |
| Phase 1 | Least | High |
| Phase 2 | High | Least |
| Phase 3 | Low | Medium |
| Phase 4 | Medium | Low |

Figure 5:
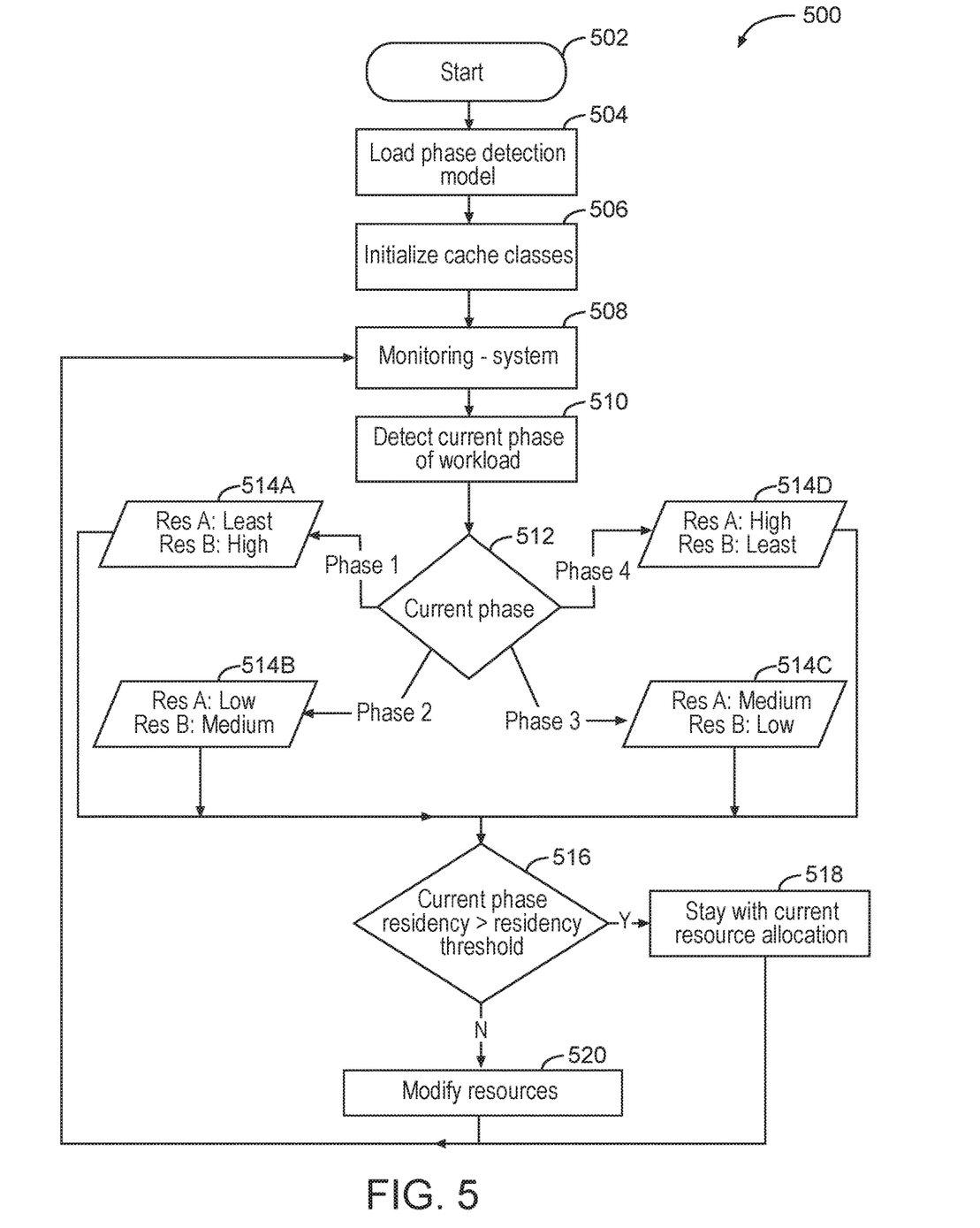
FIG. 5 illustrates an example phase-based resource management method in accordance with some embodiments.

For each workload, current phase of the workload can be detected based on hardware metrics and phase detection model. Using a phase-to-resources mapping and phase residency, a determination can be made as to whether to take remedial action or not. For example, if Phase 1 requires more of Resource B, but the Phase 1 is not expected to last much longer, methods in accordance with various embodiments may refrain from providing more of Resource B. FIG. 5 illustrates an example phase-based resource management method 500 in accordance with some embodiments. In FIG. 5, resources are allocated using the four classes of resource usage described above.

The example method 500 can begin with operation 502 and proceed to operation 504 where the compute node/s 104, 105 load phase detection models. As described herein, the compute nodes 104, 105 will have previously generated the phase detection models during an initial machine learning phase for use in determining various phases of a workload during subsequent execution of the corresponding workload. The phase detection models can be loaded from local memory or received from network storage or from cloud database 108, 109 (FIG. 1). The example method can continue with operation 506 in which cache classes can be initialized, and with operation 508 with the compute nodes 104, 105 monitoring workloads as described earlier herein to detect the current phases of the workloads in operation 510. For example, at operation 510, the compute node 104, 105 can access phase detection models stored in the cloud database/s 108, 109 to determine the current phase/s of any workload/s executing on the compute node 104, 105. The compute node 104, 105 can also determine the phase residency of the workload in that phase by retrieving the phase residency from the corresponding workload fingerprint.

The example method 500 can continue with decision block 512 in which the method 500 can branch depending upon the current phase (e.g., phases 514A-514D) to determine the identity and amount of resources used for the current phase. For example, for the four possible phases used in the example above, the method 500 can branch in one of four different directions to decide how much of what particular resources are needed. For example, if Phase 4 is detected, the compute node 104, 105 can determine that a high amount of Resource A is used, and a least amount of Resource B is used, relative to the other phases (e.g., Phase 1, Phase 2, and Phase 3). While four phases and two types of resources are described, it will be appreciated that workloads can exhibit any number of phases that use any type of resource/s and any amount of those resource/s.

Once the phase is determined the method can proceed to decision block 516. At decision block 516, the compute node 104, 105 can determine whether the current phase residency is greater than a residency threshold. If the current phase residency is greater than the residency threshold, the method 500 can proceed to operation 518 in which the compute node 104, 105 leaves the current resource allocation unmodified. If the current phase residency is less than the residency threshold, the method 500 can proceed to operation 520. In operation 520, the compute node 104, 105 modifies allocations. Accordingly, embodiments make decisions based on phase residency in order to avoid taking expensive actions to provide further resources to a workload when the workload is not expected to be in that phase long enough for performance benefits to outweigh transaction costs. The operations of example method 500 can thereafter repeat throughout operation of the corresponding cloud computing environment 100.

Figure 6:
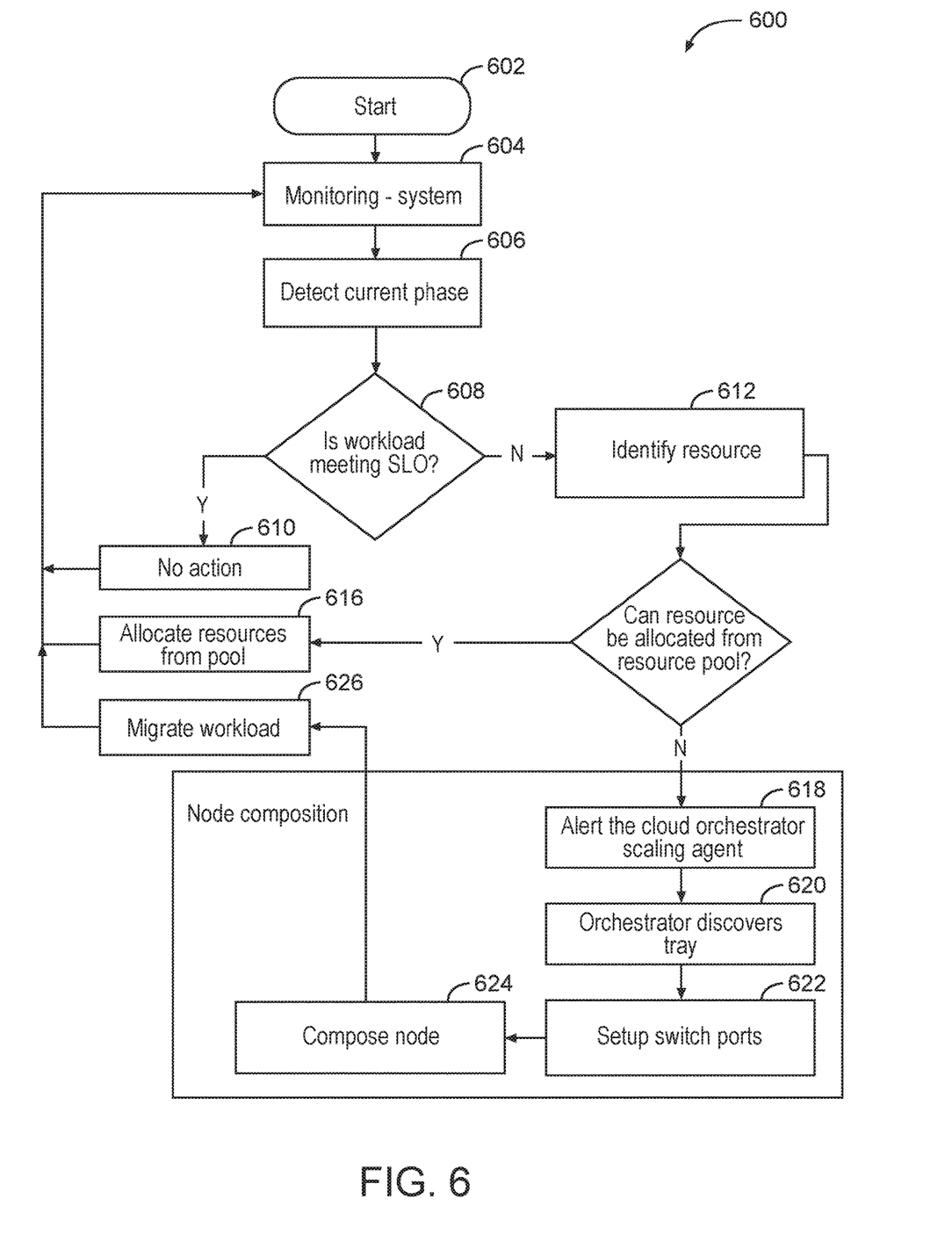
FIG. 6 illustrates an example method for compute node composition and auto-scaling based on phase information in accordance with some embodiments.

FIG. 6 illustrates an example method 600 for compute node 104, 105 composition and auto-scaling based on phase information in accordance with some embodiments. Some operations of the example method 600 can be performed by the compute nodes 104, 105 and some operations can be performed by cloud controllers 106, 107. For a computing rack that hosts a multi-tenant cloud computing environment 100, the cloud computing environment 100 can be continuously monitored and resources reallocated. If any compute node 104, 105 cannot satisfy the cumulative resource requirements of workloads executing on the respective compute node 104, 105, the corresponding cloud controller 106, 107 can allocate additional physical resources (e.g., memory and storage) from a resource. Additionally or alternatively, the cloud controller/s 106, 107 can compose a new compute node 104, 105 with resources allocated to run a specific class of workloads. For example, the cloud controller 106, 107 can create a compute node 104, 105 based on a processor with a higher operating frequency to support workloads that benefit from processors with higher operating frequencies. Further, by using phase transition probability (using, e.g., the phase transition likelihood matrix 220 or phase transition matrix 222 (FIG. 2)), the cloud controller 106, 107 can compose compute nodes 104, 105 in anticipation of any spike in demand for resources.

The method 600 can begin at operation 602 and proceed to operation 604 where the system can be monitored. For example, a compute node 104, 105 can read current hardware event counts. The example method 600 can proceed to operation 606 in which the compute nodes 104, 105 detect the current phase of workloads. Once the current phase of the workloads has been detected, the example method 600 can proceed to decision block 608 where a determination can be made (e.g., by cloud controller 106, 107 or compute node 104, 105) as to whether the workload is meeting the terms of an SLO. If the system is meeting the terms of the SLO, the method 600 can proceed to operation 610 where no action is taken and the method 600 proceeds to operation 604 to continue monitoring the system.

If the workload is not meeting the terms of the SLO, the method 600 can proceed to operation 612 where the cloud controller 106, 107 can identify resources that can be used to mitigate (i.e., reduce) the SLO deficiency by a selected amount. For example, if more memory or processing power is needed, additional memory, processors, or processing cores can be identified. Once the additional resources are identified, the method 600 can proceed to decision block 614 where a determination can be made as to if the identified resources are available (e.g., if the resources are available in a resource pool). For example, based on a user's SLA or other constraints, the identified resources may not be available for a given workload. As an additional example, if the identified cores are being utilized for a different workload, then they may not be available for use by the workload.

If the resources are available, the method 600 can proceed to operation 616 where the resources can be allocated from a resource pool as described herein. If the resources are not available, the method 600 can proceed to operation 618 wherein a cloud orchestrator scaling agent (e.g., a component of server 110 or other component of the network 120) can be alerted to the need for additional nodes to be initialized. The method 600 can proceed to operation 620 where the cloud orchestrator scaling agent can discover additional trays. Once the additional trays are identified, the method 600 can proceed to operation 622 where switch ports can be set up. Once the switch ports are set up, the method 600 can proceed to operation 624 where a compute node (or a bare metal server) can be composed with suitable resources that have been allocated from a resource pool.

Once the additional compute node/s have been composed, the method 600 can proceed to operation 626 where the workload can be migrated to the newly composed compute node (or bare metal server). The method 600 can proceed to operation 605 where the system can continue to be monitored.

Figure 7:
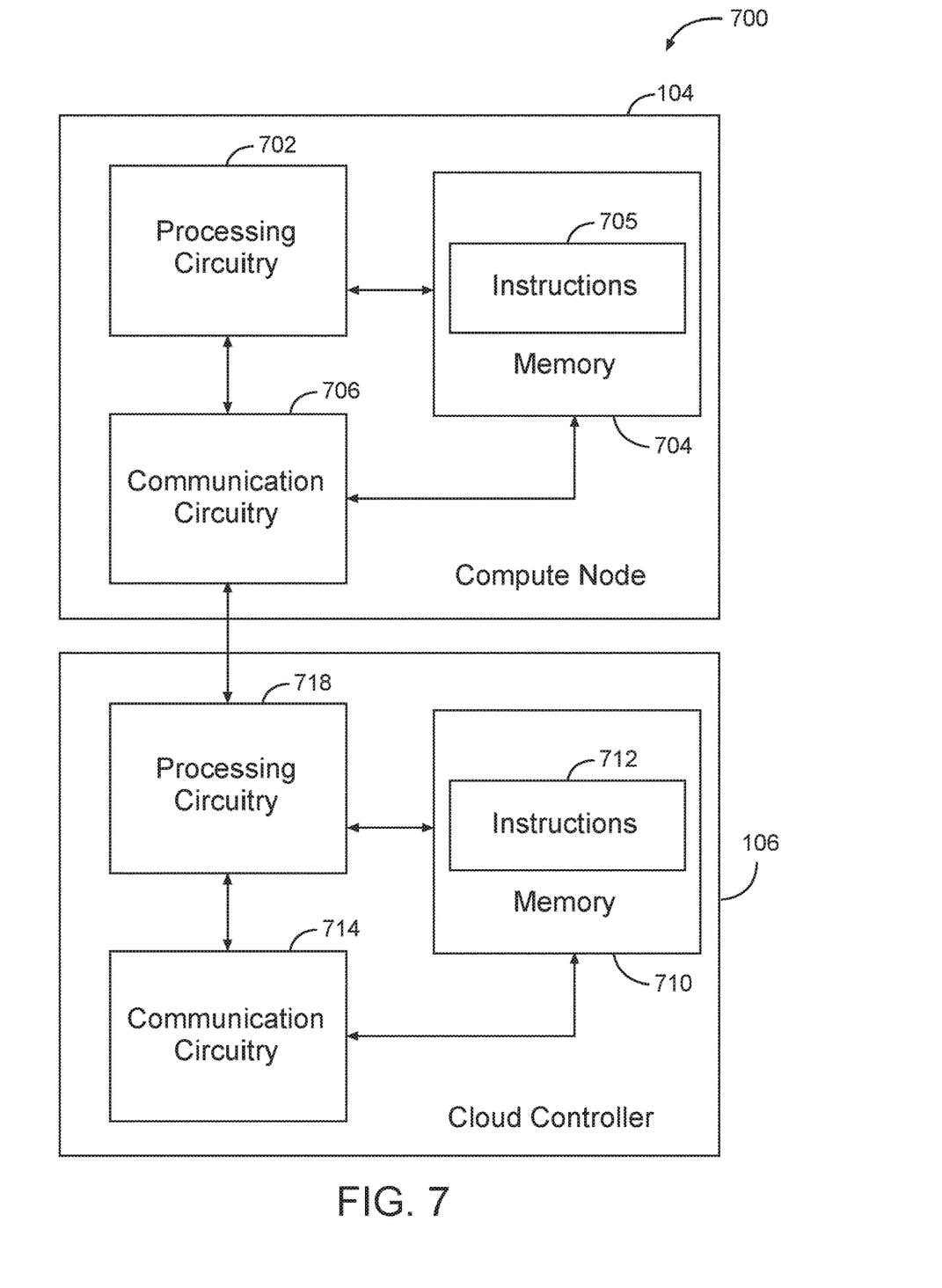
FIG. 7 illustrates a schematic of a compute node in communication with a cloud controller in accordance with various embodiments.

FIG. 7 illustrates a schematic 700 of a compute node 104 in communication with a cloud controller 106 in accordance with various embodiments. The compute node 104 and cloud controller 106 can operate together to maintain SLOs according to embodiments described earlier herein. The example compute node 104 includes processing circuitry 702, memory 704, and communication circuitry 706, and the example cloud controller 106 includes processing circuitry 710, memory 712, and communication circuitry 716. In other words, the compute node 104 and the cloud controller 106 can include similar components and can be similar devices (e.g., a server). In embodiments, the compute node 104 can operate as a compute blade or rack of compute blades in a rack-scale architecture (RSA) and the cloud controller 106, 107 can control a computing rack including multiple compute blades.

Of course, the compute node 104 and the cloud controller 106 can include other or additional components, such as those commonly found in a server device (e.g., various input/output devices), in other embodiments. Additionally, in some embodiments, one or more of the illustrative components may be incorporated in, or otherwise form a portion of, another component. For example, memory 704, or portions thereof, may be incorporated in the processing circuitry 702 in some embodiments. A cloud database 108 provides storage accessible by both the compute node 104 and the cloud controller 106. Copies or portions of cloud database 108 may be stored in memory 704 of the compute node 104 and/or the memory 712 of cloud controller 106.

The communication circuitry 706 of the compute node 104 and the communication circuitry 716 of the cloud controller 106 can include network cards, various I/O devices, etc. The processing circuitry 702 of the compute node 104 and the processing circuitry 710 of the cloud controller 106 can include one or more processors, and each of these processors can be a multi-core processor, a single or multi-core processor(s), digital signal processor, microcontroller, or other processor or processing/controlling circuit. The processing circuitry 702 of the compute node 104 can generate a phase sequence matrix that indicates the identity and number of phases of a workload by measuring resources used in the compute node 104 during execution of the workload throughout a lifetime of the workload as described earlier herein.

The processing circuitry 702 can generate a workload fingerprint. As described earlier with respect to FIGS. 3 and 4, the workload fingerprint includes at least the phase sequence matrix and a phase residency matrix. The phase residency matrix indicates the fraction of execution time that the workload spends in each phase identified in the phase sequence matrix. The processing circuitry 702 can receive a value corresponding to an SLO via the communication circuitry 706 from the cloud controller 106. The processing circuitry 702 can allocate a resource of the compute node 104 based on the workload fingerprint and based on comparisons between the value corresponding to the SLO parameter and measurements made during operation of the compute node in a network.

The processing circuitry 718 of the cloud controller 106 can detect that a compute node operating in a network controlled by the controller is unable to satisfy an SLO as described earlier herein with respect to FIG. 6. The processing circuitry 718 can identify a resource of the compute node that will mitigate the SLO deficiency. The processing circuitry 718 can determine whether the resource is available in a resource pool accessible by the cloud controller 106. If the resource pool has available resources, the processing circuitry can allocate the resource to the compute node if the resource is available in the resource pool. Otherwise, the processing circuitry 718 can generate a new compute node and migrate at least one workload to the new compute node.

The memory 704 of the compute node 104 and the memory 710 of the cloud controller 106 can include any type of volatile or non-volatile memory or data storage capable of performing the functions described herein. In operation, the memory 704, 710 can store various data and software (e.g., the instructions 705, 712) used during operation of the compute node 104 and the cloud controller 106 such as operating systems, applications, programs, libraries, and drivers, and as such the memory 704, 710 can also be termed a "machine-readable medium." The instructions 705 can cause processing circuitry 702 to perform operations including generating a phase sequence matrix that indicates the identity and number of phases of a workload by measuring resources used in the compute node during execution of the workload throughout a lifetime of the workload. The instructions 705 can cause the processing circuitry 702 to generate a workload fingerprint. As described earlier herein, the workload fingerprint can include the phase sequence matrix and a phase residency matrix. The phase residency matrix can indicate the fraction of execution time of the workload spends in each phase identified in the phase sequence matrix. The instructions 705 can cause the processing circuitry 702 to receive a value corresponding to a SLO via the communication circuitry and to allocate a resource of the compute node 104 based on the workload fingerprint and based on comparisons between the value corresponding to the SLO parameter and measurements made during operation of the compute node in a network.

Instructions 712 can cause processing circuitry 718 to detect that a compute node operating in a network controlled by the controller is unable to satisfy a service level objective (SLO) of the network; identify a resource of the compute node that will mitigate the SLO deficiency; determine whether the resource is available in a resource pool accessible by the controller; and allocate the resource to the compute node if the resource is available in the resource pool.

The memory 704, 710 (of the compute node 104 and the cloud controller 106, respectively) is communicatively coupled to the respective processing circuitry 702, 718 via an I/O subsystem, which can include circuitry and/or components to facilitate input/output operations with the respective processing circuitry 702 or 718, the respective memory 704 or 710, and other components. For example, the I/O subsystem can include memory controller hubs, input/output control hubs, firmware devices, communication links (i.e., point-to-point links, bus links, wires, cables, light guides, printed circuit board traces, etc.) and/or other components and subsystems to facilitate the input/output operations.

The communication circuitry 706 of the compute node 104 and the communication circuitry 714 of the cloud controller 106 can include a communication circuit, device, or combination thereof, to perform communications with other compute nodes, cloud controllers or any other device or sensor (e.g., thermal sensors) in the cloud computing environment 100. The communication circuitry 706, 714 can be configured to use any one or more communication technology (e.g., wired or wireless communications) and associated protocols (e.g., Ethernet, Bluetooth®, Wi-Fi®, WiMAX, etc.) to effect such communication.

The instructions 705, 712 may further be transmitted or received over a communications network using a transmission medium utilizing any one of a number of transfer protocols (e.g., frame relay, internet protocol (IP), TCP, user datagram protocol (UDP), hypertext transfer protocol (HTTP), etc.). Example communication networks may include a local area network (LAN), a wide area network (WAN), a packet data network (e.g., the Internet), mobile telephone networks ((e.g., channel access methods including Code Division Multiple Access (CDMA), Time-division multiple access (TDMA), Frequency-division multiple access (FDMA), and Orthogonal Frequency Division Multiple Access (OFDMA) and cellular networks such as Global System for Mobile Communications (GSM), Universal Mobile Telecommunications System (UMTS), CDMA 2000 1x* standards and Long Term Evolution (LTE)), Plain Old Telephone (POTS) networks, and wireless data networks (e.g., Institute of Electrical and Electronics Engineers (IEEE) 802 family of standards including IEEE 802.11 standards (WiFi), IEEE 802.16 standards (WiMax®) and others), peer-to-peer (P2P) networks, or other protocols now known or later developed.

The term "transmission medium" shall be taken to include any intangible medium that is capable of storing, encoding or carrying instructions for execution by hardware processing circuitry, and includes digital or analog communications signals or other intangible medium to facilitate communication of such software.

Additional Notes & Examples

Example 1 includes subject matter (such as a compute node, server, or any other electrical apparatus, device, or processor) including communication circuitry; and processing circuitry to generate a phase sequence matrix that indicates an identity and number of phases of a workload by measuring resources used in the compute node during execution of the workload throughout a lifetime of the workload; generate a workload fingerprint, the workload fingerprint including the phase sequence matrix and a phase residency matrix, the phase residency matrix indicating a fraction of execution time of the workload spends in each phase identified in the phase sequence matrix; receive a value corresponding to a service level objective (SLO) via the communication circuitry; and allocate a resource of the compute node based on the workload fingerprint and based on comparisons between the value corresponding to the SLO parameter and measurements made during operation of the compute node in a network.

In Example 2, the subject matter of Example 1 can optionally include wherein the processing circuitry is further to identify phases of the workload, the phases being characterized by the type and amount of resources being used by the workload during the phase to be identified, to generate a phase detection model.

In Example 3, the subject matter of Example 2 can optionally include wherein the processing circuitry is further to create a map data structure that maps phases of the workload to amounts and types of resources used during each phase of the workload.

In Example 4, the subject matter of Example 3 can optionally include wherein the processing circuitry is further to: determine a current phase and a phase residency of the workload; and when a value for the phase residency is less than a threshold, allocate resources to the workload according to a mapping of the current phase of the workload to resource requirements of the current phase of the workload.

In Example 5, the subject matter of any of Examples 2-4 can optionally include wherein the phase of the workload is detected based on an effect of execution of the workload on service compute unit (SCU) scores, wherein an SCU defines the SLO parameter in terms of a compute consumption metric measured in instructions per second.

In Example 6, the subject matter of any of Examples 2-5 can optionally include wherein the processing circuitry is further to update the phase detection model and the workload fingerprint.

In Example 7, the subject matter of any of Examples 2-6 can optionally include wherein the processing circuitry is further to: calculate a joint probability that indicates the probability of two or more workloads entering the same phase; and allocate additional amounts of a resource according to the joint probability when the joint probability indicates that two or more workloads will use the resource.

In Example 8, the subject matter of any of Examples 2-7 can optionally include wherein the processing circuitry is to provide at least one of the workload fingerprint or the phase detection model over the communication circuitry to the cloud database.

In Example 9, the subject matter of any of Examples 2-8 can optionally include wherein the processing circuitry is further to: collect event data and values for metrics during execution of the workload; and provide the event data to an Adaboost algorithm for identification of the respective workload.

In Example 10, the subject matter of Example 9 can optionally include wherein the metrics include at least two of frequency, interprocess communication metrics, cache occupancy, memory bandwidth, or instructions per cycle (IPC).

In Example 11, the subject matter of any of Examples 1-10 can optionally include wherein the network includes a multi-tenant cloud computing network.

Example 12 includes subject matter (such as a cloud server, a cloud controller, a controller, a computing device, or other electrical apparatus, device, or processor) including communication circuitry; and processing circuitry configured to: detect that a compute node operating in a network controlled by the controller is unable to satisfy a service level objective (SLO) of the network; identify a resource of the compute node that will mitigate the SLO deficiency; determine whether the resource is available in a resource pool accessible by the controller; and allocate the resource to the compute node when the resource is available in the resource pool.

In Example 13, the subject matter of Example 12 can optionally include wherein the processing circuitry is further to generate a new compute node when the resource is not available in the resource pool; and migrate at least one workload to the new compute node.

In Example 14, the subject matter of Example 12 can optionally include wherein the controller controls a computing rack that hosts a multi-tenant cloud computing environment.

Example 15 includes subject matter such as a machine-readable medium including instructions that, when executed by processing circuitry on a machine (such as a compute node, server, tray, or any other electrical apparatus, device, or processor) causes the machine to perform operations comprising: generating a phase sequence matrix that indicates an identity and number of phases of a workload by measuring resources used in the compute node during execution of the workload throughout a lifetime of the workload; generating a workload fingerprint, the workload fingerprint including the phase sequence matrix and a phase residency matrix, the phase residency matrix indicating a fraction of execution time of the workload spends in each phase identified in the phase sequence matrix; receiving a value corresponding to a service level objective (SLO) via the communication circuitry; and allocating a resource of the compute node based on the workload fingerprint and based on comparisons between the value corresponding to the SLO parameter and measurements made during operation of the compute node in a network.

In Example 16, the subject matter of Example 15 can optionally include wherein the instructions further cause the processing circuitry to perform operations including: identifying phases of the workload, the phases being characterized by the type and amount of resources being used by the workload during a corresponding phase, to generate a phase detection model; providing the phase detection model to a cloud database; and creating a map data structure that maps phases of the workload to amounts and types of resources used during each phase of the workload.

In Example 17, the subject matter of any of Examples 15-16 can optionally include wherein the instructions further cause the processing circuitry to perform operations including: during operation in the network, determining a current phase and a phase residency of the workload; and when a value for the phase residency is less than a threshold, allocating resources to the workload according to a mapping of the current phase of the workload to resource requirements of the current phase of the workload.

In Example 18, the subject matter of any of Examples 15-16 can optionally include wherein the instructions further cause the processing circuitry to perform operations including: updating the phase detection model and the workload fingerprint based on measurements made during operation in the network.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplate are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure and is submitted with the understanding that it will not be used to interpret or limit the scope or meaning of the claims. Also, in the above Detailed Description, various features may be grouped together to streamline the disclosure. However, the claims may not set forth features disclosed herein because embodiments may include a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. A compute node comprising:
communication circuitry; and
processing circuitry to
generate a phase sequence matrix that indicates an identity and number of phases of a workload by measuring resources used in the compute node during execution of the workload, the phases being characterized by type and amount of resources being used by the workload during the phase to be identified;
generate a workload fingerprint, the workload fingerprint including the phase sequence matrix and a phase residency matrix, the phase residency matrix indicating a fraction of execution time the workload spends in each phase identified in the phase sequence matrix;
receive a value corresponding to a service level objective (SLO) via the communication circuitry; and
allocate a resource of the compute node based on the workload fingerprint and based on comparisons between the value corresponding to the SLO parameter and measurements made during operation of the compute node in a network, wherein the phase residency matrix of the workload fingerprint is used to predict an amount of time that the workload is expected to remain within a phase and to refrain from making changes to current resource allocations if the predicted amount of time is below a threshold.

2. The compute node of claim 1, wherein the processing circuitry is further to:
identify phases of the workload to generate a phase detection model.

3. The compute node of claim 2, wherein the processing circuitry is further to create a map data structure that maps phases of the workload to amounts and types of resources used during each phase of the workload.

4. The compute node of claim 3, wherein the processing circuitry is further to:
determine a current phase and a phase residency of the workload; and
when a value for the phase residency is less than a threshold, allocate resources to the workload according to a mapping of the current phase of the workload to resource requirements of the current phase of the workload.

5. The compute node of claim 2, wherein the phase of the workload is detected based on an effect of execution of the workload on service compute unit (SCU) scores, wherein an SCU defines the SLO parameter in terms of a compute consumption metric measured in instructions per second.

6. The compute node of claim 2, wherein the processing circuitry is further to:
update the phase detection model and the workload fingerprint.

7. The compute node of claim 2, wherein the processing circuitry is further to:
calculate a joint probability that indicates the probability of two or more workloads entering the same phase; and
allocate additional amounts of a resource according to the joint probability when the joint probability indicates that two or more workloads will use the resource.

8. The compute node of claim 2, wherein the processing circuitry is to:
provide at least one of the workload fingerprint or the phase detection model over the communication circuitry to the cloud database.

9. The compute node of claim 2, wherein the processing circuitry is further to:
  collect event data and values for metrics during execution of the workload; and
  provide the event data to an Adaboost algorithm for identification of the respective workload.

10. The compute node of claim 9, wherein the metrics include at least two of frequency, interprocess communication metrics, cache occupancy, memory bandwidth, or instructions per cycle (IPC).

11. The compute node of claim 1, wherein the network includes a multi-tenant cloud computing network.

12. A non-transitory machine-readable medium storing instructions that, when executed by processing circuitry, cause the processing circuitry to perform operations comprising:
  generating a phase sequence matrix that indicates an identity and number of phases of a workload by measuring resources used in the compute node during execution of the workload throughout a lifetime of the workload, the phases being characterized by type and amount of resources being used by the workload during the phase to be identified;
  generating a workload fingerprint, the workload fingerprint including the phase sequence matrix and a phase residency matrix, the phase residency matrix indicating a fraction of execution time the workload spends in each phase identified in the phase sequence matrix;
  receiving a value corresponding to a service level objective (SLO) via a communication circuitry; and
  allocating a resource of the compute node based on the workload fingerprint and based on comparisons between the value corresponding to the SLO parameter and measurements made during operation of the compute node in a network, wherein the phase residency matrix of the workload fingerprint is used to predict an amount of time that the workload is expected to remain within a phase and to refrain from making changes to current resource allocations if the predicted amount of time is below a threshold.

13. The non-transitory machine-readable medium of claim 12, wherein the instructions further cause the processing circuitry to perform operations including:
  identifying phases of the workload to generate a phase detection model;
  providing the phase detection model to a cloud database; and
  creating a map data structure that maps phases of the workload to amounts and types of resources used during each phase of the workload.

14. The non-transitory machine-readable medium of claim 13, wherein the instructions further cause the processing circuitry to perform operations including:
  during operation in the network, determining a current phase and a phase residency of the workload;
  when a value for the phase residency is less than a threshold, allocating resources to the workload according to a mapping of the current phase of the workload to resource requirements of the current phase of the workload.

15. The non-transitory machine-readable medium of claim 13, wherein the instructions further cause the processing circuitry to perform operations including:
  updating the phase detection model and the workload fingerprint based on measurements made during operation in the network.

16. A compute node comprising:
  means to generate a phase sequence matrix that indicates an identity and number of phases of a workload by measuring resources used in the compute node during execution of the workload throughout a lifetime of the workload, the phases being characterized by type and amount of resources being used by the workload during the phase to be identified;
  means to generate a workload fingerprint, the workload fingerprint including the phase sequence matrix and a phase residency matrix, the phase residency matrix indicating a fraction of execution time the workload spends in each phase identified in the phase sequence matrix;
  means to receive a value corresponding to a service level objective (SLO); and
  means to allocate a resource of the compute node based on the workload fingerprint and based on comparisons between the value corresponding to the SLO parameter and measurements made during operation of the compute node in a network, wherein the phase residency matrix of the workload fingerprint is used to predict an amount of time that the workload is expected to remain within a phase and to refrain from making changes to current resource allocations if the predicted amount of time is below a threshold.

17. The compute node of claim 16, comprising:
  means to identify phases of a workload to generate a phase detection model.

* * * * *